United States Patent

Kansupada et al.

[11] Patent Number: 5,284,715
[45] Date of Patent: Feb. 8, 1994

[54] RUBBER SURFACE IDENTIFICATION COATING AND RUBBER PRODUCTS PREPARED THEREFROM

[75] Inventors: Bharat K. Kansupada, Mogadore; Larry L. Mershon, Harville; Christopher J. Koscho, Stow, all of Ohio

[73] Assignee: The Goodyear Tire & Rubber Company, Akron, Ohio

[21] Appl. No.: 940,413

[22] Filed: Sep. 3, 1992

[51] Int. Cl.$^5$ .............................................. B32B 27/08
[52] U.S. Cl. ...................................... 428/519; 427/380; 427/393.5; 428/521; 156/307.3; 156/123; 156/137; 264/134
[58] Field of Search ................ 524/399, 394; 427/380, 427/393.5; 428/519, 521; 264/134; 156/307.3, 123, 137

[56] References Cited

U.S. PATENT DOCUMENTS

| | | | |
|---|---|---|---|
| 4,558,086 | 12/1985 | Ramp et al. | 524/399 |
| 4,857,397 | 8/1989 | Mowdood | 428/323 |
| 4,946,717 | 8/1990 | Magnus | 427/393.5 |
| 4,967,814 | 11/1990 | Kansupada | 152/524 |
| 5,058,648 | 10/1991 | Kansupada | 152/524 |
| 5,137,070 | 8/1992 | Kansupada | 152/524 |
| 5,149,591 | 9/1992 | Patisas et al. | 428/423.1 |
| 5,175,203 | 12/1992 | Kansupada et al. | 524/399 |
| 5,182,142 | 1/1993 | Hart et al. | 427/393.5 |

*Primary Examiner*—Michael Lusignan
*Assistant Examiner*—Erma Cameron
*Attorney, Agent, or Firm*—Henry C. Young, Jr.

[57] ABSTRACT

The marking of a surface of an uncured diene rubber product with a marking, or identifying coating, which disappears upon curing the rubber. In one aspect, the coating is applied as a water based dispersion of a white colored metallic salt of a fatty acid having a melting point below 150° C. (e.g. zinc stearate) in a sulfur curable polymeric latex binder. An article can be produced thereby as a cured assembly of rubber components.

8 Claims, No Drawings

RUBBER SURFACE IDENTIFICATION COATING AND RUBBER PRODUCTS PREPARED THEREFROM

FIELD

This invention relates to coating a surface of an uncured sulfur curable diene rubber product, followed by curing the coated rubber product wherein the said coating disappears upon curing. The invention further relates to a method of fabricating rubber products with at least one component of an uncured rubber surface having an identifying coating thereon and to products composed of such an assembly of rubber components. The invention additionally relates to coating an uncured carbon black-containing diene rubber composition with a contrastingly visible composition composed of an aqueous dispersion and/or emulsion of a white colored metallic salt of a fatty acid such as, for example, zinc stearate, and a sulfur curable diene polymer latex; followed by drying said coating and then co-curing the coating and rubber compositions.

BACKGROUND

Uncured rubber surfaces are often marked, or coated, with an identifying marking composition which, after curing the coated rubber in a suitable mold at an elevated temperature and pressure, retains its identifying characteristic.

Conventionally, organic solvent based coating compositions are used for such purpose, primarily because the identifying, or marking, composition is organic solvent-soluble and the organic solvent itself is usually chosen for its ability to wet the uncured rubber surface and, also, to have a suitable drying time.

However, for some applications, it is desired that (1) the identifying marking disappears upon curing the rubber article, and (2) the identifying marking composition is applied as a water based coating.

Water-based coating compositions for application to rubber surfaces, particularly uncured rubber surfaces are sometimes desired, and particularly water-based compositions which can be effectively applied to the uncured rubber surface and which will disappear upon curing the coated rubber.

In another aspect, it would be desired that the applied coating will cause minimal, if any, fouling of the curing mold surface (generally a metal mold surface such as a steel metal surface) against which the coating is pressed under conditions of elevated temperature (120° C.–60° C.) and pressure as the coated rubber is cured. By mold surface fouling it is meant the build-up of substances on the curing mold surface from the rubber product itself, or from a coating on the rubber product, during the curing process. Such mold fouling is well known to those having skill in the rubber curing art.

Thus, various of the preformed, unassembled rubber components may desirably be marked in their uncured state with a water-based coating composition for identification purposes. Such marking may be used for various individual tire components such as, for example, its rubber components of tread, sidewall and carcass.

Indeed, in some instances, it is desired that the uncured rubber components are individually labeled, or identified by a marking composition, or ink, so that they can be individually stored and later identified and utilized in the assembly and fabrication process.

For example, in practice, for the manufacture of rubber tires, a tread rubber might first be formed as an extruded strip of carbon black containing uncured rubber with identifying marking(s) being applied to the rubber. Then, the marked rubber tread strip is built into the tire and the resulting tire assembly cured at an elevated temperature.

It is important that the aqueous based marking composition desirably have the properties of chemical and mechanical stability, visibility (particularly on black-colored rubber surfaces), co-curability with the rubber substrate to enhance adhesion to the rubber surface, ease of application, wettability to the uncured rubber substrate surface and cause minimal mold fouling during general use.

Therefore, for this invention it is desired that an identifying coating composition be applied to an uncured rubber substrate which, upon curing the coated rubber substrate, disappears or at least substantially disappears so that it is not easily recognizable without a very close detailed inspection.

Although not necessarily limited thereto but as a preferred aspect, it is desired the uncured rubber substrate contains carbon black, as well as the curative, and is, therefore, black in color. In such instance, it is desired that the coating composition has a color that visibly contrasts with black, such as a white color. Thus, zinc stearate is prescribed.

For the coating itself, it is also desired that it is film forming on the rubber substrate surface in that a continuous film on the cured rubber surface is obtained with a minimal, if any, cracking of its surface for a reasonable period of time after its application, is compatible with conventional rubber compositions, and, in its aqueous application stage, has a suitable drying time on the rubber surface at conventional ambient temperatures of about 20° C. to about 30° C.

Zinc stearate has a distinguishing white color against a background of a black colored rubber surface. However, a zinc stearate by itself is unsatisfactory for coating a rubber substrate surface because it does not have flexibility and is not sufficiently film forming.

Zinc stearate, when mixed with a rubber solution in an organic solvent, can be applied to a black colored rubber surface and used as a distinguishing white coating. However, as hereinbefore pointed out, it is desired that an aqueous mixture is used. Indeed, in one aspect of the invention it is desired that the coating composition be applied to the rubber substrate as a water based dispersion and/or emulsion.

Indeed, it is desired that the coating does contain a colorant, such as zinc stearate, of a color which contrasts with the rubber, particularly black colored rubber. It is further desired that the coating have a sulfur curable polymeric binder for the zinc stearate in order to form a suitable continuous film on the rubber surface, have a degree of flexibility and be co-curable with the rubber substrate itself.

Thus, it is envisioned that the marking composition would, basically, be composed of the aforesaid zinc stearate filler and a curable polymer binder, particularly a compatible, sulfur curable rubber binder, for the filler. It is to be appreciated that it is contemplated that additional materials may be added to the coating composition such as, for example, wetting agent, emulsifier(s) and flattening agent(s).

However, for an aqueous mixture, an inherent difficulty presents itself in using zinc stearate with a rubber latex.

Indeed, conventional rubber latices made with natural soaps (fatty acids and rosin acid soaps) are prone to destabilize in the presence of multivalent salts such as zinc stearate.

In the description of this invention, the terms compounded rubber, rubber compound and rubber composition as well as rubber substrate may be used somewhat interchangeably to refer to rubber which has been mixed with compounding ingredients, typically including carbon black, zinc oxide, zinc stearate or stearic acid, pigments resin(s) and curatives, or curing agents.

DISCLOSURE AND PRACTICE OF THE INVENTION

In accordance with this invention, a composition is provided which is comprised of (A) 100 parts by weight of a metallic salt of a fatty acid, said salt having a melting point below 150° C., preferably zinc stearate, (B) as a binder therefor, about 20 to about 25 parts by weight of a polybutadiene rubber.

In practice, zinc stearate utilized for industrial purposes typically contains a very small amount of zinc oleate and, thus, is usually not a completely pure zinc stearate. Therefore, the term "zinc stearate" as used herein is intended to mean such zinc stearate.

The polybutadiene rubber is preferably an emulsion polymerization prepared polybutadiene containing a synthetic anionic emulsifier. (A water-based polymerization system with an anionic emulsifier). It is referred to herein, in its water-based state, as a polybutadiene latex.

In order to provide a coating of such a composition, particularly for a sulfur curable diene rubber substrate surface, a water-based mixture is provided which comprises a blend of polybutadiene latex containing an anionic, preferably an alkyl aryl sulfonate, emulsifier and an aqueous dispersion of a zinc stearate.

In the practice of this invention, a coated (marked) rubber article is provided by a method which comprises the steps of (A) coating a surface of a sulfur curable, black colored diene rubber which contains carbon black and sulfur based curative(s) and comprised of a blend of polybutadiene latex containing a synthetic anionic emulsifier and aqueous dispersion of zinc stearate, (B) drying the applied coating composition on the rubber surface, and (C) co-curing the coating composition and rubber article in a suitable mold under conditions of elevated temperature and pressure wherein the said coating composition autogenously cures at its interface with the rubber surface in the presence of sulfur curative contained in the rubber article itself.

The invention is also directed to the cured coated rubber article.

The pH of the aqueous coating composition may be a factor for providing a good coating on the rubber substrate.

The pH of the water based coating composition can readily be accomplished by several means, if desired. For example, the polybutadiene latex, with its synthetic anionic emulsifier, may typically have a pH of about 8.8 to about 9.0. The zinc stearate water dispersion may have a pH of about 7 to about 9. Sodium hydroxide (water solution), although not considered to be needed in this example, could be added to the zinc stearate dispersion to increase its pH, if necessary. Then the latex and dispersion are blended. Alternatively, and usually preferably, the latex and dispersion are blended and a water solution of sodium hydroxide added, if necessary, to raise the blend's pH to a range of about 9 to about 10, for example.

The zinc stearate water based dispersion itself is preferably of a very high concentration of fine particle size zinc stearate. For example, the dispersion may contain from about 40 to about 50, or even up to about 65 weight percent zinc stearate in the water.

Preferably, the coating composition may also contain, as a flattening agent, a minimal amount, such as about 0.05 to about 0.3 parts by weight large particle size and/or high tint carbon black and/or silica, preferably carbon black. Such flattening agents and their use in coatings are well known to those having skill in such coating art.

It is also recognized by those having skill in such coating art that wetting agent(s) are often used to help and/or cause the coating composition to wet the rubber surface.

It is important to appreciate that the zinc stearate preferably contributes a substantially white color to the coating composition.

Accordingly, a polymeric rubber binder is utilized so that the zinc stearate, or other white colored metallic salt of fatty acid having a softening point below 150° C., is a primary colorant, yielding a composition that is substantially white in color, unless a dye or other colorant is added. Thus, if the rubber binder is not entirely clear and has a residual color (many rubbers have, for example, a light brown, light yellow or straw color), it preferably is of a very light color so that the overall coating composition is of a light color, preferably white, or an off-white, that contrasts with black. The flattening agent is used in such a small amount that the coating is still typically a white or slightly off-white.

While it is appreciated that a pigment or other colorant, might be desired to be utilized in the marking composition by a user, this description has been directed to describing the marking composition without such colorant, although it is intended that this invention includes the zinc stearate, or other white colored metallic salt of fatty acid having a melting point below 150° ; based marking composition, whether or not a colorant is added to create a color differing form white or off-white.

In a preferred aspect of this invention, the said rubber composition substrate is a sulfur curable diene rubber composition which contains carbon black and, thus, is black in color. As a result the aforesaid coating composition, containing the zinc stearate, readily contrasts with the black colored rubber substrate so that the coating readily marks and, thus, identifies the coated rubber substrate.

In the practice of this invention, it is considered that the polymer binder for the zinc stearate, namely, the sulfur curable diene rubber, preferably the aforesaid emulsion polymerization prepared polybutadiene rubber with the anionic emulsifier, plays an important part for providing a continuous film as compared to coating of zinc stearate. It is also intended to reduce or eliminate a cracked appearance of the zinc stearate coating on the uncured rubber surface. The described polybutadiene is desirably suited for the practice of this invention because it is co-curable with the diene rubber substrate (autogenous cure), and is an effective binder for the zinc stearate and, also because the polybutadiene latex itself, with its anionic emulsifier, has been found to be able to be effectively blended with the aqueous zinc stearate dispersion.

It has also been observed that the polybutadiene latex, with a relatively low extractable content (after the coating is dried) results in a minimized curing mold fouling.

Preferably, as hereinbefore pointed out, the rubber substrate contains carbon black and is, thus, black in color due to the carbon black, although the rubber substrate may of some other color so long as it contrasts with the marking coating composition.

In further accordance with this invention, a method of manufacturing a rubber product comprises the steps of (A) providing a diene rubber composition component containing carbon black and sulfur based curative therefor and having an identifying contrastingly white colored marking coating thereon, preferably a white color, and according to this invention, (B) assembling two or more rubber components consisting of at least one of said marked rubber composition components together to form a composite product of two or more rubber components, and (C) curing said product under conditions of an elevated pressure and a temperature of at least about 135° C., preferably at least about 140° C. depending somewhat upon the product type, size and rubber composition, wherein said contrasting white color of the marking composition remains.

In practice, the said coating mixture, in addition to the zinc stearate, or other white colored metallic salt of fatty acid, polybutadiene binder, water and synthetic anionic emulsifier, also usually desirably contains wetting agent(s) and flattening agent(s) therefor.

A primary purpose of the sulfur curable diene (polybutadiene) rubber binder is to cause the coating to be continuous, as previously discussed, and which has also been observed to minimize cure mold fouling.

A primary purpose of a flattening agent(s) is to reduce contrast and reduce reflectance of the light from the coating.

Representative flattening agents are, for example, carbon black, such as, for example, large particle size carbon blacks and silica. Carbon black is usually preferred, although silica may be more appropriate when using colored rubber substrates other than black substrates. Thus, for a black colored rubber substrate, it is preferred to use carbon black instead of silica. Carbon blacks typically used in the paint and coating industry are preferred. For example, those having a tint strength of about 100-125 and/or a large particle size are considered as being suitable although, in practice, other carbon blacks may be found to be useful.

The polybutadiene latex produced with a synthetic anionic emulsifier is used so that, as it has been observed, a pre-precipitation, or coagulation, of the butadiene caused by addition of aqueous dispersion of zinc oxide is retarded or, basically, eliminated, at least over a relatively short period of time. Thus, it is preferred to use the synthetic anionic emulsifier as compared to a natural soap emulsifier which might be anionic. Various synthetic anionic emulsifiers can be used such as, for example, an alkyl aryl sulfonate. Such type of emulsifier is well known by those having skill in the emulsion polymerization art.

As previously pointed out, the drying time of the coating mixture on the rubber substrate (e.g. at 24° C.) should be long enough for the coating mixture to wet the rubber surface and, also, to be short enough, on a practical basis, so that the water suitably evaporates from the rubber surface treated rubber component(s) so that rubber components may, if desired, be assembled in a relatively short time.

An important feature of the applied coating, is that it is, basically, a continuous film made possible by the polymer (the aforesaid polybutadiene) binder for the zinc stearate, when it is the metallic salt of a fatty acid. Thus, the ratio of zinc stearate to the polybutadiene rubber in the coating composition is important because it is considered that excessive zinc stearate promotes a cracking or flaking of the coating and excessive polymer binder may promote a build-up on the curing mold surface.

As is well known to having skill in the rubber art, sulfur curable diene rubbers and blends thereof, e.g. rubber used for the said rubber substrate, are rubbers which contain carbon-to-carbon double bonds which sulfur acts upon to create the cured rubber products. Usually such high unsaturation diene derived rubbers (carbon-to-carbon bond unsaturation) are selected from one or more diene unit containing rubbers which may include, for example, although not limited to, cis 1,4-polybutadiene, trans 1,4-polybutadiene, cis 1,4-polyisoprene, trans 1,4-polyisoprene, medium vinyl polybutadiene and styrene/butadiene copolymer rubbers.

Thus, the method of this invention can be used to aid in the marking and assembly of rubber components for various articles and products including tires and industrial products, including belts and hoses.

It is to be appreciated that the uncured or partially cured rubber substrate is typically a blend of the aforesaid rubber in combination with various compounding ingredients therefor which typically includes, for example, carbon black, zinc oxide, zinc stearate or stearic acid, antidegradants such as antioxidants and antiozonants, waxes-particularly microcrystalline waxes, silica and possibly couplers for the silica, resins, sulfur and cure accelerator(s).

In the description of this invention, the term "uncured" and "uncured, sulfur curable" rubber is used. Such terms are intended to normally relate to compounded rubber which is rubber mixed with appropriate compounding ingredients, including curatives. The term is intended to include partially cured rubber, which usually means rubber which is less than about 80% cured. In the practice of this invention, it is intended that the water-based coating composition be used to coat uncured and/or partially cured compounded rubber compositions. Thus, the term "uncured", as used in this description, is intended to include both uncured and partially cured rubber.

The practice of the invention is more illustrated shown in the following Examples in which the parts and the percentages are by weight unless otherwise indicated, although the invention is not to be limited to the Examples.

EXAMPLE I

An aqueous-based coating composition was prepared of the following recipe shown in Table 1. The values reported in the column "Parts" are on a dry weight basis.

TABLE 1

| Material | Parts |
|---|---|
| A. Zinc Stearate Dispersion Zinc stearate[1] | 100 |

TABLE 1-continued

| Material | Parts |
|---|---|
| B. Polybutadiene Latex | |
|    Polybutadiene[4] | 20 |
| C. Other Materials | |
|    Wetting Agent[2] | 0.03 (approximate) |
|    Carbon black flattening agent[3] | 0.05 (approximate) |
|    Water | as required |

[1] A zinc stearate dispersion obtained from the Witco Chemical Corporation having a pH of about 7 to 9. The zinc stearate value of 100 is reported as the "dry" weight of zinc stearate. The dispersion contained about 50 weight percent zinc stearate.
[2] Obtained as a fluorosurfactant as Zonyl FSP from Du Pont de Nemours and Company.
[3] Carbon black based, as 844-9555 carbon black dispersion, from Andvex Corp., a division of Huels, New Jersey.
[4] Obtained as Tylac-DL8504 from Reichhold Chemicals, Inc. having a Ph of about 8.9. The polybutadiene itself is reported as 100 on a dry weight basis. The latex contained about 44 weight percent polybutadiene which was produced by emulsion polymerization using a synthetic anionic emulsifier.

The polybutadiene latex was slowly added to the zinc stearate dispersion, with mild stirring.

EXAMPLE II

An uncured rubber sample is prepared having a dimension of about 7.6 cm by about 15.2 cm and a thickness of about 0.3 cm.

The uncured rubber sample is identified as Exp. A and is comprised of ingredients shown in Table 2.

TABLE 2

| Material | Parts Exp. A |
|---|---|
| Natural rubber (polyisoprene) | 50 |
| SBR Rubber | 50 |
| Carbon black | 50 |
| Process oil | 10 |

Conventional amounts of zinc oxide, stearic acid, antidegradant(s) accelerator(s) and sulfur are used.

EXAMPLE III

The uncured rubber sample Exp. A identified in Table 2 herein is treated by coating one surface thereof with a coating of Example I at a temperature of about 24° C. followed by allowing the coating to dry for about several minutes at about 24° C. to form a thin film of less than one mil thickness. The drying time for the coating composition on the rubber surface is considered to be adequate.

As the coating dried on the rubber substrate surface, it is considered that the zinc stearate and polybutadiene rubber formed an effective, continuous coating.

The coated rubber surface has an appearance which can be described as an off-white color, non-glossy and a continuous film.

The coated rubber is cured at about 150° C. for about one half hour.

The contrastingly coated surface of the rubber essentially disappeared upon curing the rubber and is discernable only upon a very close inspection.

In the description of this invention, the preferred marking composition has sometimes been referred to as being white, although, in practice, the color may be what could be described as an off-white, or an almost white or a dirty white. For the description of the invention as contained herein, the term "white" is intended to mean any and all of such color variations.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a rubber article which comprises the steps of (A) coating a surface of a sulfur curable, black colored diene rubber which contains carbon black and sulfur based curative(s) with a water-based coating composition comprised of a blend of polybutadiene rubber latex prepared by emulsion polymerization utilizing and containing a synthetic anionic emulsifier and aqueous dispersion of zinc stearate, (B) drying the applied coating composition on the rubber surface, and (C) co-curing the coating composition and rubber article in a suitable mold at an elevated temperature of about 120° C. to about 160° C., wherein said coating composition is comprised of 100 parts by weight of zinc stearate and about 20 to about 25 parts by weight of said polybutadiene rubber.

2. The method of claim 1 where said anionic emulsifier for the polybutadiene rubber latex is an alkyl aryl sulfonate.

3. The method of claim 1 where said coating composition also contains from about 0.05 to about 0.3 parts carbon black and/or silica.

4. A cured rubber article prepared according to the method of claim 1.

5. A cured rubber article prepared according to the method of claim 2.

6. A cured rubber article prepared according to claim 3.

7. A method of manufacturing a rubber product comprises the steps of (A) providing a diene rubber composition component containing carbon black and sulfur based curative therefor and having an identifying contrastingly white colored marking coating composition thereon and prepared according to claim 1, (B) assembling two or more rubber components consisting of at least one of said marked rubber composition components together to form a composite product of two or more rubber components, and (C) curing said composite at a temperature of about 120° C. to about 160° C. wherein said contrasting color of the marking composition becomes essentially invisible; wherein said marking composition is comprised of (A) 100 parts by weight of zinc stearate, and (B) as a binder therefor, about 20 to about 25 parts by weight to polybutadiene rubber prepared by aqueous emulsion polymerization and containing an alkyl aryl sulfonate emulsifier.

8. A rubber product prepared according to the method of claim 7.

* * * * *